UNITED STATES PATENT OFFICE.

RUDOLF EBERHARD, OF MUNICH, GERMANY.

WATER-GLASS COMPOUND AND PROCESS OF MAKING THE SAME.

944,957.  Specification of Letters Patent.  Patented Dec. 28, 1909.

No Drawing.  Application filed July 9, 1908.  Serial No. 442,785.

*To all whom it may concern:*

Be it known that I, RUDOLF EBERHARD, citizen of Germany, residing at Munich, Germany, have invented certain new and useful Improvements in Water-Glass Compounds and Processes of Making the Same; and I do hereby declare the following to be a full, clear, and exact description of the invention, such as will enable others skilled in the art to which it appertains to make and use the same.

It is the object of the present invention to improve the physical properties of waterglass in solution and to enhance its chemical reactivity and liquidity without substantially changing its specific gravity, by chemically reacting on the same in such a way that the compounds formed remain in solution.

According to my invention the well-known inertness and quick drying properties of the waterglass solution are reduced, it is made more fluid without disturbing to a substantial extent its degree of concentration and binding or adhesive properties. Its viscosity being thus diminished, it can be worked and handled much more readily for the various purposes for which it is applied. The advantages of these improved properties accrue in every branch of industry in which waterglass is employed; in particular the invention leads to very pronounced beneficial results when applied to waterglass used as a binder and fixing agent for colors or paints.

In carrying out my invention, relatively minute quantities of a chromium compound, such as dissolved chromic acid, chromates, including bichromates, or chrome alums are added to the waterglass, alone or mixed, with other compounds. The chlorids of meta-chromic acid may also be used for this purpose. It is to be noted, as an essential characteristic of my invention, that these bodies all react with the waterglass which nevertheless remains in solution.

As an example of a solution embodying my invention, I give the following: To a solution of one hundred kilograms of waterglass having a specific gravity of from about 1.139 to about 1.29 (equal to from about 18° to about 33°, Baumé) I add 70 grams of bichromate of potassium dissolved in water, or instead of the bichromate of potassium I may add fifty grams of dissolved chromic anhydrid. In employing the waterglass or soluble silicate so prepared as an adhesive, a binder or a fixing agent for colors or paints, I attain the advantage, among others, that because of its increased fluidity the paint penetrates much deeper into the surface to which it is applied, than when employing ordinary waterglass. Thereby a much intenser silicification takes place in time in the paint and between it and the surface to which it is applied, thus enhancing the durability and resistance to the influences of the weather and climate. This is mainly due to the fact that although the fluidity of the waterglass has been greatly increased the percentage of silicic acid has not been diminished as contradistinguished from the ordinary waterglass mixtures in which either the fluidity or the percentage of silicic acid has been greatly reduced according to whether the waterglass has been mixed with thick or thin substances.

Ordinary waterglass when mixed with pigments or colors, even when these are combined with so-called weather resisting additions, is open to the objection that when it is exposed to the atmosphere the silicic acid is rapidly thrown out in the form of a white hard mass, so that the paint or color prepared with it curdles and thickens even after the lapse of a day, so that it is rendered unfit for use. When, however, it is desired to remedy this defect under the old methods, the waterglass is diluted, the percentage of silicic acid reduced, and the binding power of the paint is greatly diminished. On the other hand, if under my invention the waterglass solution is mixed with a comparatively minute quantity of a chromium compound and the whole is then mixed with the same colors, then the new and very characteristic result is obtained, that while the percentage of silicic acid is maintained substantially unreduced, this silicic acid is precipitated only very slowly in a more colloidal form, at first in the form of a light flaky precipitate and later as a jelly-like mass having a consistency somewhat like butter, in which mass each particle of color or pigment is evenly embedded in a binder of a peculiar form of highly colloidal silicic acid. When employing such a paint mixture the silicification of the coating is more homogeneous and the color moreover gains in covering power. By maintaining this colloidal form of the silicate for a long time the pigment and waterglass will remain in intimate mixture for a long time so that a deposit of the color in the receptacle takes place only very slowly. As a matter of fact, the paint remains in a serviceable fluid condition for several days and may be applied and worked with much greater ease than the old form of waterglass paint. Moreover, in my new compound the silicic acid in the waterglass is modified in its properties, in the sense that any direct reaction of the waterglass with many colors or pigments is retarded or even prevented. Since such combinations reduce the fluidity by precipitating out silica and hence interfere with the facility of spreading or applying the paint, this is another signal advantage flowing from this invention.

Although a coating of paint containing the binder according to my invention hardens more slowly than one employing the old form of waterglass solutions, it remains more elastic whereby its durability is increased.

The changed chemical action of the silicic acid compounds in waterglass prepared with chromium compounds according to my invention is shown also by the fact, that the said silicic acid compounds, after being separated out of the waterglass mass, may again be dissolved by a relatively small amount of potassium lye in the cold or almost cold way, whereas the silica deposited from ordinary waterglass on standing is relatively insoluble under these conditions.

In employing waterglass prepared with chromium compounds according to my invention as a fixing medium for painting, there is obtained in the dry paint a completely transparent vitrification and silicification so that the colors show up in all their brightness and luminosity. On using ordinary waterglass on the other hand the silicic acid which is thrown out, renders such paintings more or less cloudy or smoky, as is well known.

In some cases the colors or pigments may be directly combined with the necessary amount of the chromium compounds and then mixed with an ordinary waterglass solution. Or only a portion of the chromium compounds may be added to the said colors, whereupon they are mixed with a waterglass solution having less than the required amount of chromium compound. In preparing the chromium waterglass solution the chromium compound may also be added to the raw materials used for the manufacture of the waterglass, instead of adding the same to the waterglass solution. Again, under another modification of my invention the waterglass solution to which the chromium compound has been added may be evaporated to dryness and then mixed in a powdered form with the colors suitably mixed. Or a mixture of ordinary waterglass powder with the necessary quantity of powdered chromium compound is made and then prepared with a solution of caustic alkali to which ordinary waterglass may be added. The color mixture may also be prepared with lime paste for some purposes.

In using this new waterglass solution prepared as described for various purposes there may be added glutinous substances such as tragacanth, dextrin, starch or, in some cases, cellulose, according to the use to which the same is to be put, for example, when painting on a distemper ground. These substances may in some cases be added to the colors or pigments.

This waterglass solution may also be employed with advantage for coating iron or other metals to protect them against oxidation. In this case the solution may be employed either alone or mixed with suitable colors.

Waterglass solutions which have been chemically modified by the addition of minimal quantities of chromium compounds have also proved themselves valuable in the manufacture of cements, for impregnating wood, in the manufacture of plastic compounds and artificial stones, for indurating artificial and natural stones, earthen-wares, plaster-of-paris articles, cements and mortars. They may also be used in the preparation of waterglass mortars, as well as for the coating of paper, wall-paper and linen or textiles, in which case the disinfecting and antiseptic properties of the chromium compounds come into play, the solutions not only penetrating more deeply into the fiber, thereby making the same more receptive to color, but also protecting the said fiber against decay.

This new waterglass compound can also be used to great advantage in the manufacture of paper and cardboard, in the arts of dyeing and bleaching, printing, including wall-paper printing, in wool washing, in the manufacture of soap, in the preservation of casks and barrels and of eggs, or in the manufacture of matches. It may be employed advantageously in the manufacture of glazes and enamels for pottery earthenware and porcelain and other articles and also as a fertilizer and as a means for preventing the incrustation of boilers, and, in short, in all those cases where the ordinary waterglass has heretofore been used and where it is desirable to increase the physical and chemical reacting power of the same.

It has been found that the chromated waterglass prepared as above stated can with advantage be mixed with salts of bases which are soluble in alkalies or with the bases themselves or with metal oxids which are soluble in alkalies or with weak acids. Such compounds are, in particular: compounds of tin such as, for example, stannate of sodium or of potassium and other stannates and stannites, sulfid of tin dissolved in ammonia; lead compounds, e. g. lead hydrate, lead oxid or peroxid, lead carbonate, lead-acetate; compounds of manganese, e. g. manganate or permanganate of potassium; zinc compounds, such as the zincates; aluminum compounds, such as aluminates; also boric acid, oxalic acid and oxalate of ammonium. Moreover, I may use for this purpose baryta water. The above compounds may be used either alone or a mixture of several of these may be employed.

As an example of a chromated waterglass mixed with such a substance the following is given: 0.5 grams of sodium stannate dissolved in water is added to 100 grams of a chrome-salt waterglass solution prepared as above, having a density of about 20° Baumé. The mixture results in a clear solution. Or, I may add to the chrome salt waterglass solution of about 20° Baumé a solution made by dissolving 1 gram of freshly precipitated lead peroxid in a solution of caustic potash, which also yields a clear final solution. The amount of the compounds added to the chromated waterglass solution varies according to the purpose in view. These compound solutions of waterglass possess the advantage over the solutions containing only chromium, that they possess a still greater reactivity in various respects. For example, in the arts of dyeing and printing on fabrics an addition of tin compounds to the chromated waterglass solution imparts to the same the properties of an excellent mordant, in which both the chromium compound and the tin compound act on the fiber and, moreover, the dyes penetrate more deeply into the fiber and are then precipitated, in a better and more intense manner, through the action of the waterglass. The dyes are thereby rendered faster and the textile materials are heavier and more pliant, that is to say, the solutions act also as finishing agents.

In the painting and coating arts particular advantages flow from the addition of lead, manganese, zinc or aluminum compounds, of oxalic acid or oxalate of ammonium, as well as boric acid or baryta water, for the reason that the combination of waterglass solutions so prepared to the colors, renders the coatings or paintings considerably harder and hence more apt to resist injurious influences and climatic conditions. For this purpose the colors or pigments are mixed with a chromated waterglass solution to which are added such metal compounds as will form with the waterglass insoluble silicates of metal oxids. In this way the silicification is rendered homogeneous throughout the mass by virtue of the uniform distribution of the particles of silicic acid in the paint.

What I claim and desire to secure by Letters Patent is:—

1. The process of increasing the chemical and physical reactivity and liquidity of waterglass solutions which consists in adding relatively minute amounts of chromium compounds to a solution of waterglass.

2. The process of increasing the chemical and physical reactivity and liquidity of waterglass solutions which consists in the treatment of a waterglass solution with relatively minute amounts of dissolved chromium compounds and of compounds comprising a heavy metal base soluble in alkali.

3. The process of increasing the chemical and physical reactivity and liquidity of waterglass solutions which comprises the treatment of a waterglass solution with relatively minute amounts of chromium compounds and of a heavy metal oxid soluble in alkali.

4. As a new composition of matter, waterglass containing a minute quantity of a chromium compound, said waterglass forming a solution of relatively great liquidity and such solution on standing precipitating silica easily soluble in cold alkali.

5. As a new composition of matter, waterglass containing a minute quantity of chromium compound together with a heavy metal base soluble in alkali, said waterglass forming a solution of relatively great liquidity and such solution on standing precipitating silica easily soluble in cold alkali.

In testimony whereof I hereunto affix my signature in the presence of two witnesses.

RUDOLF EBERHARD.

Witnesses:
LOUIS MUELLER,
MATHILDE R. HELD.

Schroeder, (German) 72801, Dec. 6, '93
Kleinsteuber  "  , 104194, June 1, '99
Winther  "  192642, Dec 5, '07.
(34-45)

Kuhlman, 15520 aug. 12, 56.
Mathes, 25456, mar 7, '82
Browning, 389497, Sep. 11, 88,
Gordon 671548, apr. 9, 81.
(134-45)

McLennan, 872960, Dec 3, '07. (134-39)
Ransome (British) 2395 of 54.
Ellis  "  - 2645 of '62
Schweig, (German) 86941, of 46.
Vogtrieck, (austrian) 5741, of '01.